(12) United States Patent
Nakamura

(10) Patent No.: US 11,809,242 B2
(45) Date of Patent: Nov. 7, 2023

(54) ELECTRONIC DEVICE AND DISPLAY DEVICE

(71) Applicant: Funai Electric Co., Ltd., Osaka (JP)

(72) Inventor: Takenori Nakamura, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 336 days.

(21) Appl. No.: 17/390,152

(22) Filed: Jul. 30, 2021

(65) Prior Publication Data

US 2022/0043490 A1 Feb. 10, 2022

(30) Foreign Application Priority Data

Aug. 6, 2020 (JP) ................. 2020-134192

(51) Int. Cl.
*G06F 1/18* (2006.01)
*G06F 1/20* (2006.01)
*H01R 13/627* (2006.01)

(52) U.S. Cl.
CPC .............. *G06F 1/183* (2013.01); *G06F 1/181* (2013.01); *G06F 1/20* (2013.01); *H01R 13/6273* (2013.01)

(58) Field of Classification Search
CPC ....................................................... H05K 7/00
See application file for complete search history.

(56) References Cited

U.S. PATENT DOCUMENTS

| 2006/0044489 | A1* | 3/2006 | Uchizono | H04N 5/64 |
| | | | | 348/E5.128 |
| 2011/0038112 | A1 | 2/2011 | Shintani et al. | |
| 2013/0235277 | A1 | 9/2013 | Suwa et al. | |
| 2018/0364517 | A1 | 12/2018 | Oh | |
| 2019/0386411 | A1 | 12/2019 | Kikuchi et al. | |
| 2020/0081482 | A1* | 3/2020 | Huang | G06F 1/1601 |

FOREIGN PATENT DOCUMENTS

| EP | 2 533 516 A1 | 12/2012 |
| JP | 55-76528 U | 5/1980 |
| JP | 2014-32296 A | 2/2014 |
| KR | 101 830 413 B1 | 2/2018 |

OTHER PUBLICATIONS

The extended European search report for the corresponding European application No. 21189034.8, dated Dec. 7, 2021.

* cited by examiner

*Primary Examiner* — Jerry Wu
(74) *Attorney, Agent, or Firm* — Global IP Counselors, LLP

(57) ABSTRACT

An electronic device comprises a housing, an electronic unit attached to the housing, a fixing section provided to the housing and including a first hook that holds the electronic unit relative to the housing, and movement restricting section arranged relative to the first hook to restrict movement of the first hook.

18 Claims, 10 Drawing Sheets

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

SECOND EMBODIMENT

THIRD EMBODIMENT

ELECTRONIC DEVICE AND DISPLAY DEVICE

CROSS-REFERENCE TO RELATED APPLICATIONS

This application claims priority to Japanese Patent Application No. 2020-134192 filed on Aug. 6, 2020. The entire disclosure of Japanese Patent Application No. 2020-134192 is hereby incorporated herein by reference.

BACKGROUND

Field of the Invention

The present invention generally relates to an electronic device and a display device. More specifically, the present invention relates to an electronic device and a display device comprising a hook.

Background Information

Some electronic devices are equipped with a hook for latching a printed circuit board (see, Japanese Utility Model Application Publication No. S55-76528 (Patent Literature 1), for example).

Patent Literature 1 discloses an electronic tuning television receiver. This television receiver comprises a printed circuit board on which a tuning voltage generation circuit and electronic components are disposed, and a holding frame that holds the printed circuit board. This holding frame includes an elastically deformable arm piece or hook. With this television receiver, the printed circuit board is fixed by the arm piece.

SUMMARY

However, with the television receiver described in Patent Literature 1, since the printed circuit board is fixed by the arm piece, if an impact is applied from the outside, the printed circuit board may move in a complex way due to the external impact, causing the arm piece to open. If this happens, a problem is that the printed circuit board may fall off the arm piece due to the opening of the arm piece.

One object of this disclosure is to provide an electronic device and a display device with which it is less likely that an electronic unit will fall off a hook due to the opening of the hook when an impact is applied from outside.

In view of the state of the known technology and in accordance with a first aspect of the present invention, an electronic device comprises a housing, an electronic unit attached to the housing, a fixing section provided to the housing and including a first hook that holds the electronic unit relative to the housing, and a movement restricting section arranged relative to the first hook to restrict movement of the first hook.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Television Device

The main configuration of a television device 100 according to a first embodiment will be described with reference to FIGS. 1 and 2. The television device 100 is an example of the "electronic device" and the "display device" of the present disclosure.

Figure 1:
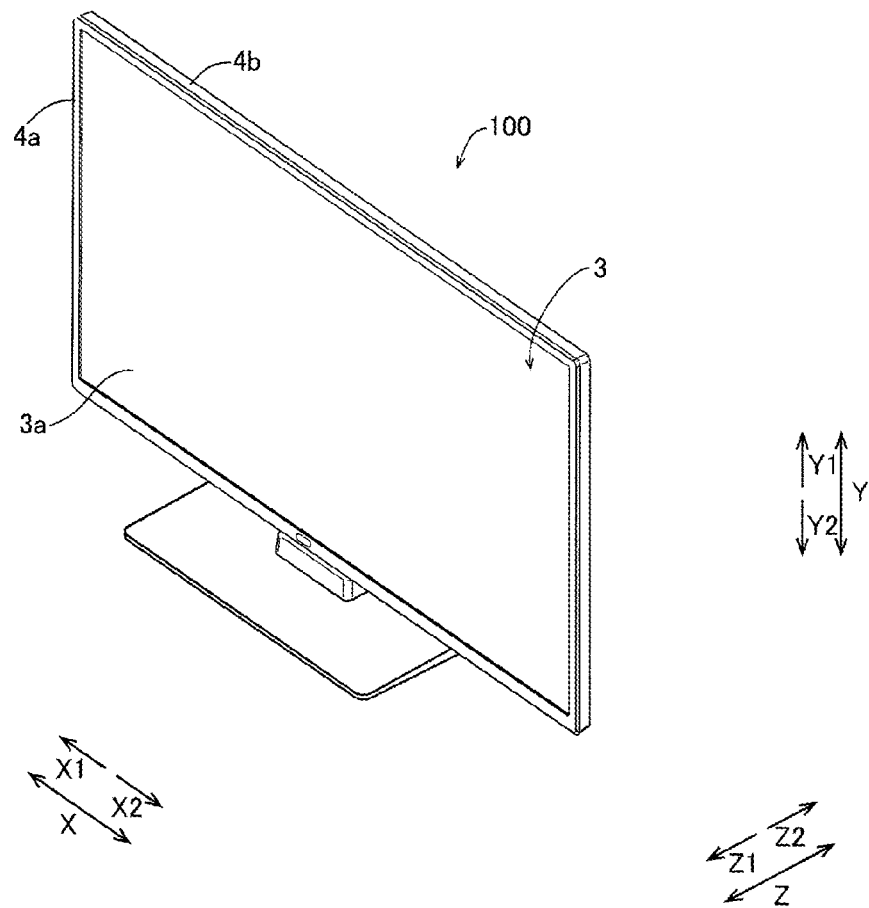
FIG. 1 is an overall front perspective view of a television device according to a first embodiment.
Figure 2:
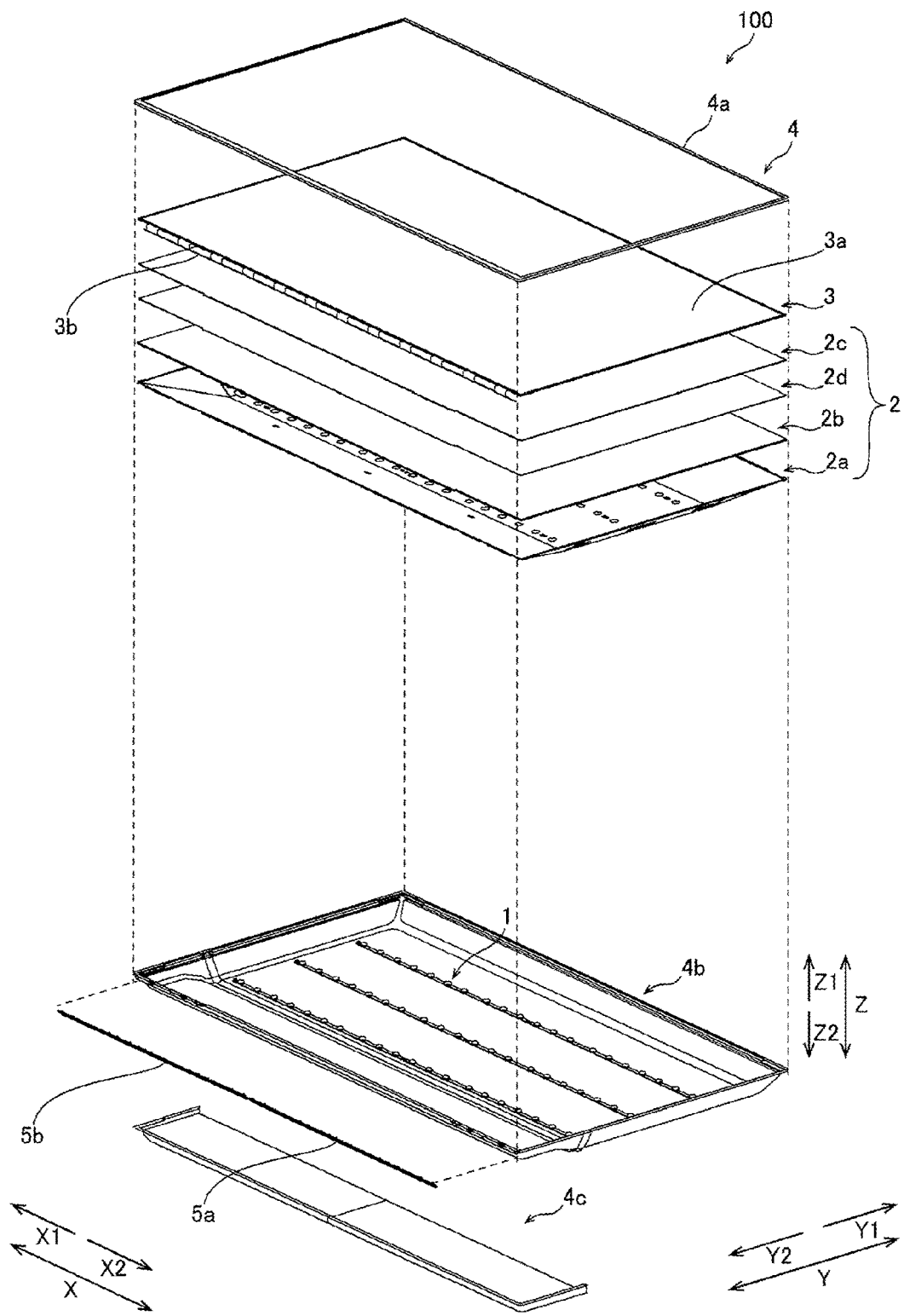
FIG. 2 is an exploded perspective view of the television device according to the first embodiment.

As shown in FIGS. 1 and 2, the television device 100 according to the first embodiment comprises a light source 1, an optical member 2, a display panel 3, and a housing 4. The television device 100 also comprises a tuner (not shown) for receiving a broadcast signal, and a control circuit (not shown) that includes a processor. The housing 4 includes a front cabinet 4a, a rear frame 4b, and a rear cover 4c. The front cabinet 4a is an example of the "housing" and the "front housing" of the present disclosure.

The light source 1 is provided to the rear frame 4b. The light source 1 is configured to emit light toward the optical member 2. The light source 1 has a plurality of LEDs (light emitting diodes). The LEDs are disposed in a straight line in a direction substantially parallel to the lengthwise direction (X direction) of the display panel 3. The light source 1 in the first embodiment is a so-called backlight type of light source. Thus, in the illustrated embodiment, the light source 1 forms a direct-lit backlight. However, the light source 1 can form different types of backlight, such as an edge-lit backlight.

The optical member 2 is disposed between the display panel 3 and the rear frame 4b in a direction (the Z direction) substantially perpendicular to a display surface 3a of the display panel 3. The optical member 2 is formed in a flat rectangular shape when viewed in the Z direction. The optical member 2 is irradiated with light from the light source 1. The optical member 2 includes a reflective sheet 2a, a diffuser plate 2b, an optical sheet 2c, and an optical sheet 2d. The reflective sheet 2a, the diffuser plate 2b, the optical sheet 2c, and the optical sheet 2d are stacked in this order from the rear frame 4b side (the Z2 direction side) toward the display panel 3 side (the Z1 direction side).

The reflective sheet 2a is configured to reflect some of the light from the light source 1 toward the diffuser plate 2b. The diffuser plate 2b is configured to diffuse the light from the light source 1. The optical sheet 2c and the optical sheet 2d are configured to adjust the polarization direction of the light, suppress the diffusion of light, and so forth, and also to irradiate the display panel 3 with light.

The display panel 3 is a liquid crystal display panel. The display panel 3 is configured to display an image by varying the transmittance of the liquid crystal with respect to the light transmitted through the optical member 2. The display panel 3 is formed in a flat rectangular shape. The long side of the display panel 3 extends in the X direction, and the short side extends in the Y direction. Also, the display panel 3 includes a liquid crystal drive circuit 3b. The liquid crystal drive circuit 3b has a COF (chip-on-film) type of semiconductor package. The liquid crystal drive circuit 3b is provided at an end portion (long side) of the display panel 3 on the Y2 direction side so as to extend along the lengthwise direction (the X direction) of the display panel 3.

The front cabinet 4a is a frame portion provided on the front side (the Z1 direction side) with respect to the display panel 3. The front cabinet 4a is formed in a rectangular frame shape. The front cabinet 4a is made of resin. Also, the front cabinet 4a is attached to the rear frame 4b by screws or other such fasteners. More specifically, the front cabinet 4a is attached to the rear frame 4b on the Y2 direction side via radiation plates 5a and 5b (discussed below).

The rear frame 4b is a support member that supports the light source 1, the optical member 2, the display panel 3, and the like. The rear frame 4b is provided on the back side (the Z2 direction side) with respect to the display panel 3 and the optical member 2. The rear frame 4b is made of metal. Also, the rear frame 4b is provided with the radiation plates 5a and 5b.

The radiation plates 5a and 5b are attached to an end portion (long side) of the rear frame 4b on the Y2 direction side by screws or other such fasteners (not shown). The radiation plates 5a and 5b are slender, flat members extending in the direction (the X direction) substantially parallel to the lengthwise direction of the display panel 3. The radiation plates 5a and 5b are configured to dissipate heat from the display panel 3. More specifically, the radiation plates 5a and 5b are configured to come into contact with the liquid crystal drive circuit 3b, which is a heat generating member of the display panel 3, to dissipate the heat of the liquid crystal drive circuit 3b. The radiation plates 5a and 5b are made of iron or another such metal having excellent heat dissipation properties. The radiation plate 5a is an example of the "heat dissipating unit" of the present disclosure.

The rear cover 4c is provided on the back side (the Z2 direction side) with respect to the rear frame 4b. The rear cover 4c is configured to cover a circuit board (not shown), which is attached to the back surface (the surface on the Z2 direction side) of the rear frame 4b, from the back side. The rear cover 4c is attached to the back surface of the rear frame 4b by screws or other such fasteners (not shown).

Electronic Unit Attachment Structure

The attachment structure of an electronic unit 6 of the television device 100 will now be described with reference to FIGS. 3 to 7.

Figure 3:
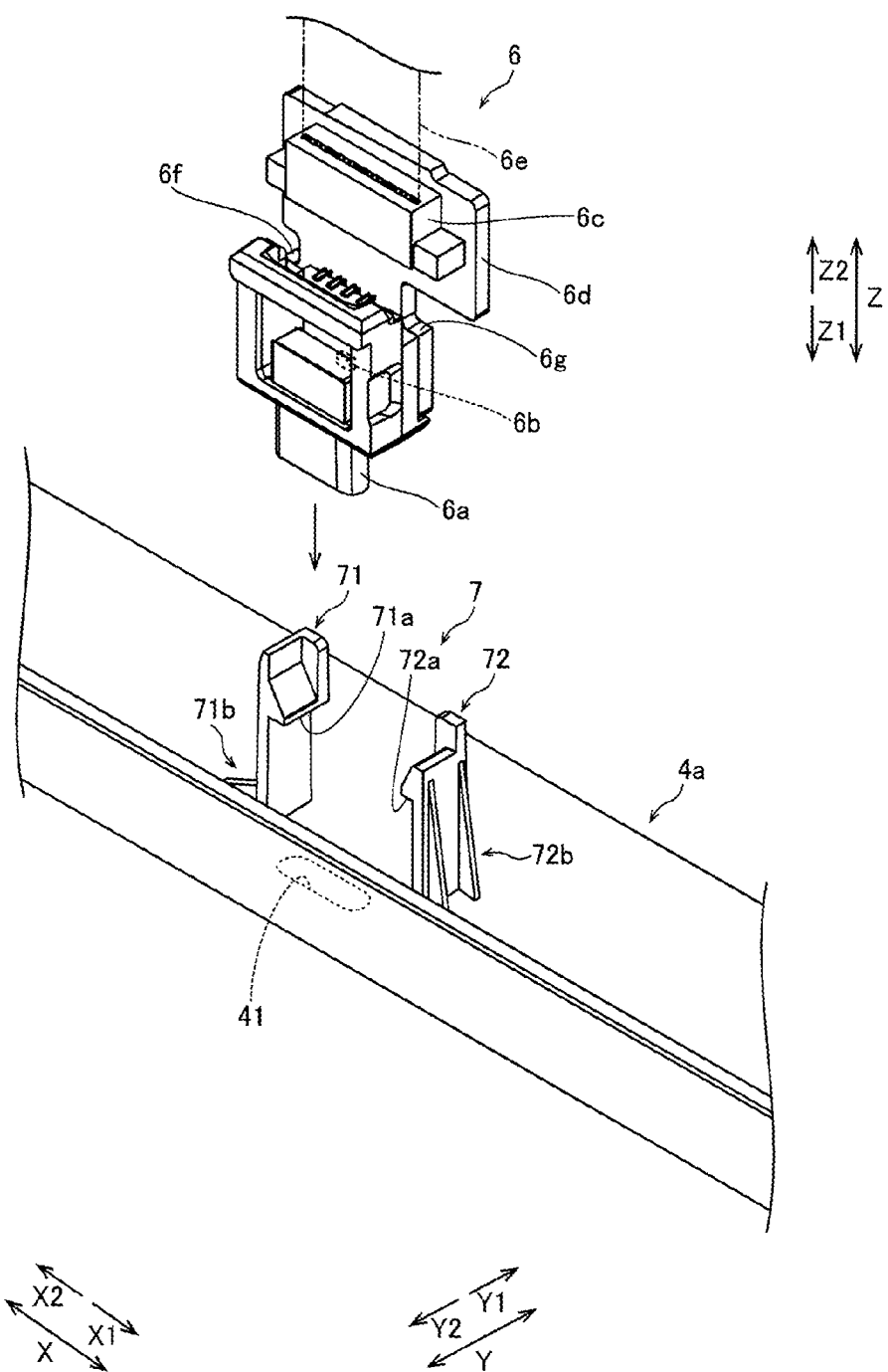
FIG. 3 is a perspective view of a state before an electronic unit is attached to a front housing according to the first embodiment.
Figure 4:
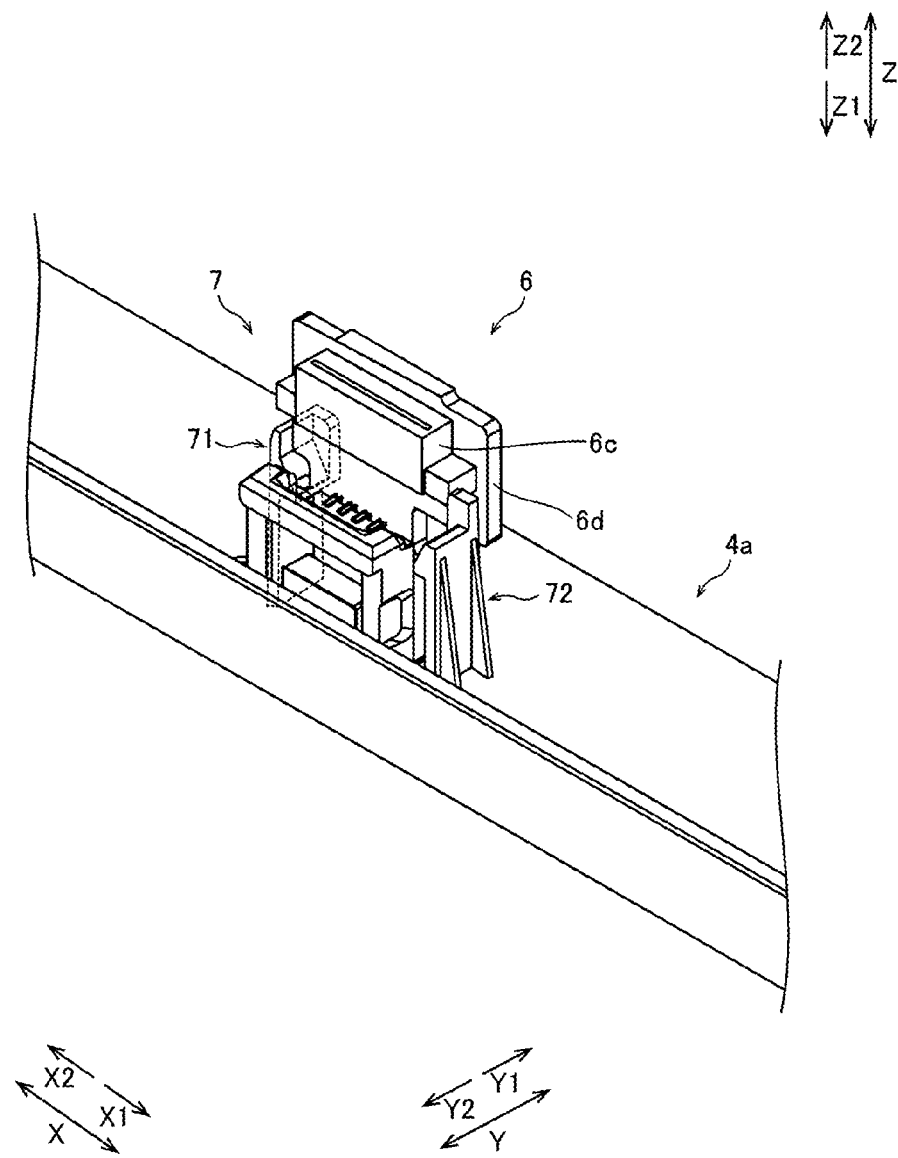
FIG. 4 is a perspective view of a state in which the electronic unit has been attached to the front housing according to the first embodiment.

As shown in FIGS. 3 and 4, the television device 100 includes the electronic unit 6 attached to the front cabinet 4a, and a fixing section 7 for fixing the electronic unit 6 to the front cabinet 4a. In the illustrated embodiment, the fixing section 7 removably holds the electronic unit relative to the front cabinet 4a.

The electronic unit 6 is a sensor unit. More specifically, the electronic unit 6 is a sensor unit for remote control operation. The electronic unit 6 is configured to receive an operation signal from a remote controller (not shown) using infrared rays. The electronic unit 6 includes a lens unit 6a, a sensor element 6b, a connector 6c, and a circuit board 6d.

The lens unit 6a is configured to guide infrared rays emitted by the remote controller to the sensor element 6b. The distal end of the lens portion 6a is exposed to the outside through an opening 41 in the front cabinet 4a.

The sensor element 6b is a light receiving element. The sensor element 6b is configured to detect infrared rays guided to the lens unit 6a, and to transmit a detection signal.

The connector 6c is connected to a wiring portion 6e such as an FFC (flexible flat cable). The connector 6c is configured to transmit the detection signal from the sensor element 6b to the control circuit of the television device 100 via the wiring portion 6e.

The circuit board 6d is a board on which wiring (circuit) is formed by conductors. Electronic components such as the sensor element 6b and the connector 6c are mounted on the circuit board 6d. The electronic unit 6 is a unit including the circuit board 6d on which the electronic components are mounted.

Also, the electronic unit 6 is provided with an engaging portion 6f that engages with a movable hook 71 (e.g., a first hook) of the fixing section 7, and an engaging portion 6g that engages with a fixed hook 72 (e.g., a second hook) of the fixing section 7. The engaging portion 6f is disposed on the X2 direction side. The engaging portion 6g is disposed on the X1 direction side. In the illustrated embodiment, the engaging portion 6f and the engaging portion 6g each include an upper facing surface facing in the Z2 direction.

The fixing section 7 is provided to the front cabinet 4a. More specifically, the fixing section 7 is provided on the back side (the Z2 direction side) of the front cabinet 4a. The fixing section 7 is provided so as to fix the electronic unit 6 on the back side (the internal side) of the front cabinet 4a. Also, the fixing section 7 is provided at an end portion of the front cabinet 4a on the Y2 direction side, in the approximate center in the X direction.

The fixing section 7 includes the movable hook 71 and the fixed hook 72. The movable hook 71 and the fixed hook 72 are integrally provided to the front cabinet 4a. Thus, in the illustrated embodiment, the front cabinet 4a with the movable hook 71 and the fixed hook 72 is a one-piece, unitary member made of resin. The movable hook 71 and the fixed hook 72 are provided so as to protrude from the front cabinet 4a to the back side (the Z2 direction side). The movable hook 71 and the fixed hook 72 are provided opposite each other in the direction (the X direction) substantially parallel to the lengthwise direction of the display panel 3, with the electronic unit 6 being interposed therebetween.

The movable hook 71 has an engaging portion or prong 71a that engages with the engaging portion 6f of the electronic unit 6. In particular, the engaging portion 71a is disposed at a distal end portion of the movable hook 71. Also, the movable hook 71 is configured to be able to open and close. More specifically, the movable hook 71 is a flexible member and is movable in the direction (the X direction) substantially parallel to the lengthwise direction of the display panel 3 by bending and deforming. In particular, the movable hook 71 can be deflected by deflecting its distal end portion along the X direction with respect to its base portion, as the origin or fulcrum point. The movable hook 71 also has a pair of ribs 71b at the base portion of the movable hook 71. The ribs 71b add support to the movable hook 71 such that the movable hook 71 has enough rigidity to hold the electronic unit 6 that has been attached to the movable hook 71 while having enough flexibility to deflect while the electronic unit 6 is being attached to the movable hook 71.

Figure 7:
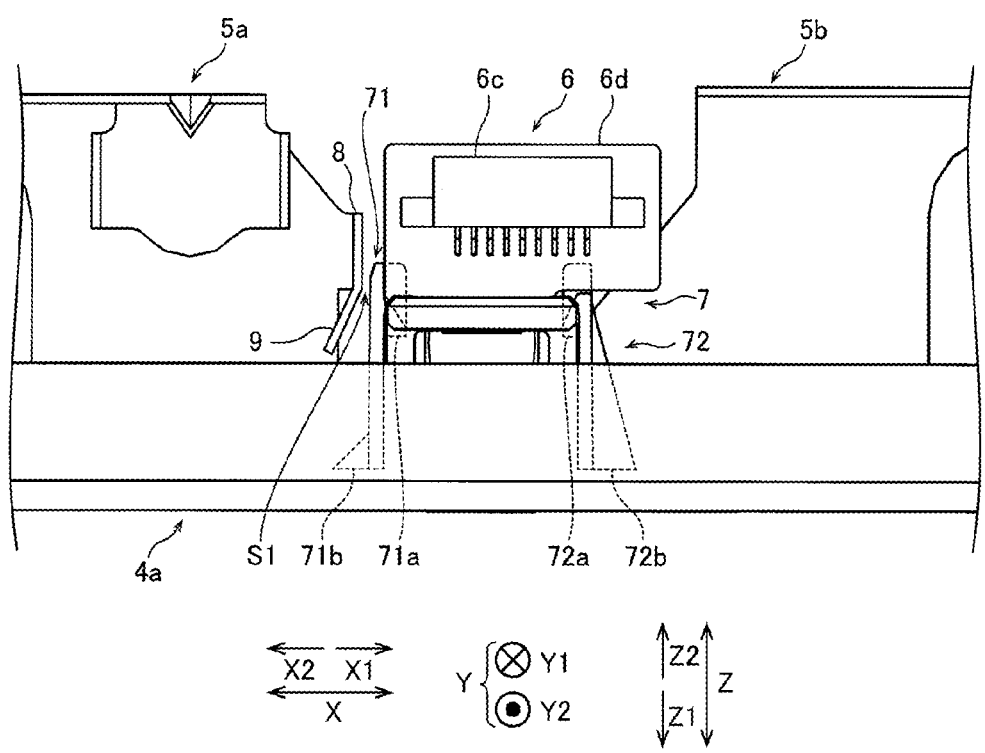
FIG. 7 is a side view of the state in which the front housing has been attached to the heat dissipating unit according to the first embodiment.

The fixed hook 72 has an engaging portion or prong 72a that engages with the engaging portion 6g of the electronic unit 6. In particular, the engaging portion 72a is disposed at a distal end portion of the fixed hook 72. Also, the fixed hook 72 does not open and close. More specifically, the fixed hook 72 is a relatively rigid member. The fixed hook 72 is immovable in the direction (the X direction) substantially parallel to the lengthwise direction of the display panel 3, and does not bend and deform. The fixed hook 72 also has a pair of ribs 72b extending from its base portion to its distal end portion along the fixed hook 72. The ribs 72b add support to the fixed hook 72 such that the fixed hook 72 has enough rigidity not to deflect while the electronic unit 6 is being attached to the fixed hook 72 and to hold the electronic unit 6 that has been attached to the fixed hook 72. Specifically, as shown in FIG. 7, the ribs 72b of the fixed hook 72 is longer than the ribs 71b of the movable hook 71 along the Z direction (i.e., the ribs 71b of the movable hook 71 is shorter than the ribs 72b of the fixed hook 72 along the Z direction), which adds more rigidity to the fixed hook 72 than the movable hook 71. Thus, in the illustrated embodiment, the fixed hook 72 is more rigid than the movable hook 71 (i.e., the movable hook 71 is more flexible than the fixed hook 72).

The electronic unit 6 is configured to be fixed to the movable hook 71 and the fixed hook 72 by being moved in the Z1 direction (attachment direction) so as not to come off in the opposite direction (the Z2 direction) from the attachment direction. In particular, the electronic unit 6 is attached to the movable hook 71 and the fixed hook 72 by sliding over slant surfaces of the engaging portions 71a and 72a and by deflecting the movable hook 71 in the X2 direction. Here, the phrases "the fixed hook 72 does not open and close" and "the fixed hook 72 is immovable, and does not bend and deform" as used herein means not only a case in which the fixed hook 72 does not open and close at all" and "the fixed hook 72 is immovable at all, and does not bend and deform at all", but also a case in which the fixed hook 72 open and close by a small amount" and "the fixed hook 72 is movable by a small amount, and bends and deforms by a small amount". In particular, the fixed hook 72 can opens and closes by a smaller amount than that of the movable hook 71 while the electronic unit 6 is being attached to the movable hook 71 and the fixed hook 72. Also, the fixed hook 72 is movable by a smaller amount than that of the movable hook 71, and bends and deforms by a smaller amount than that of the movable hook 71. In any case, in the illustrated embodiment, the movable hook 71 is more flexible than the fixed hook 72 (i.e., the fixed hook 72 is more rigid than the movable hook 71), and the movable hook 71 has a greater amount of deflection than that of the fixed hook 72 while the electronic unit 6 is being attached to the movable hook 71 and the fixed hook 72.

Figure 5:
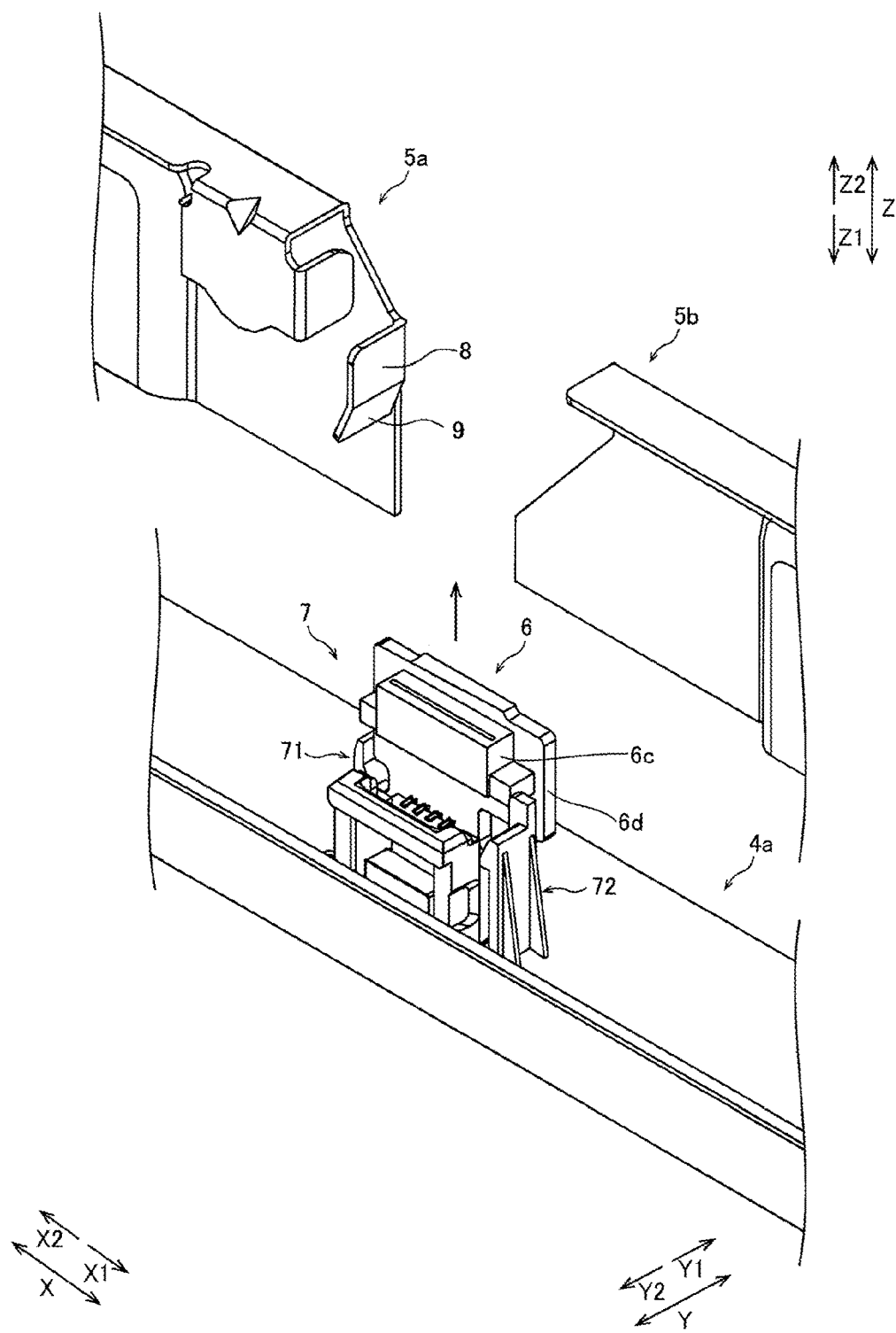
FIG. 5 is a perspective view of a state before the front housing is attached to a heat dissipating unit according to the first embodiment.
Figure 6:
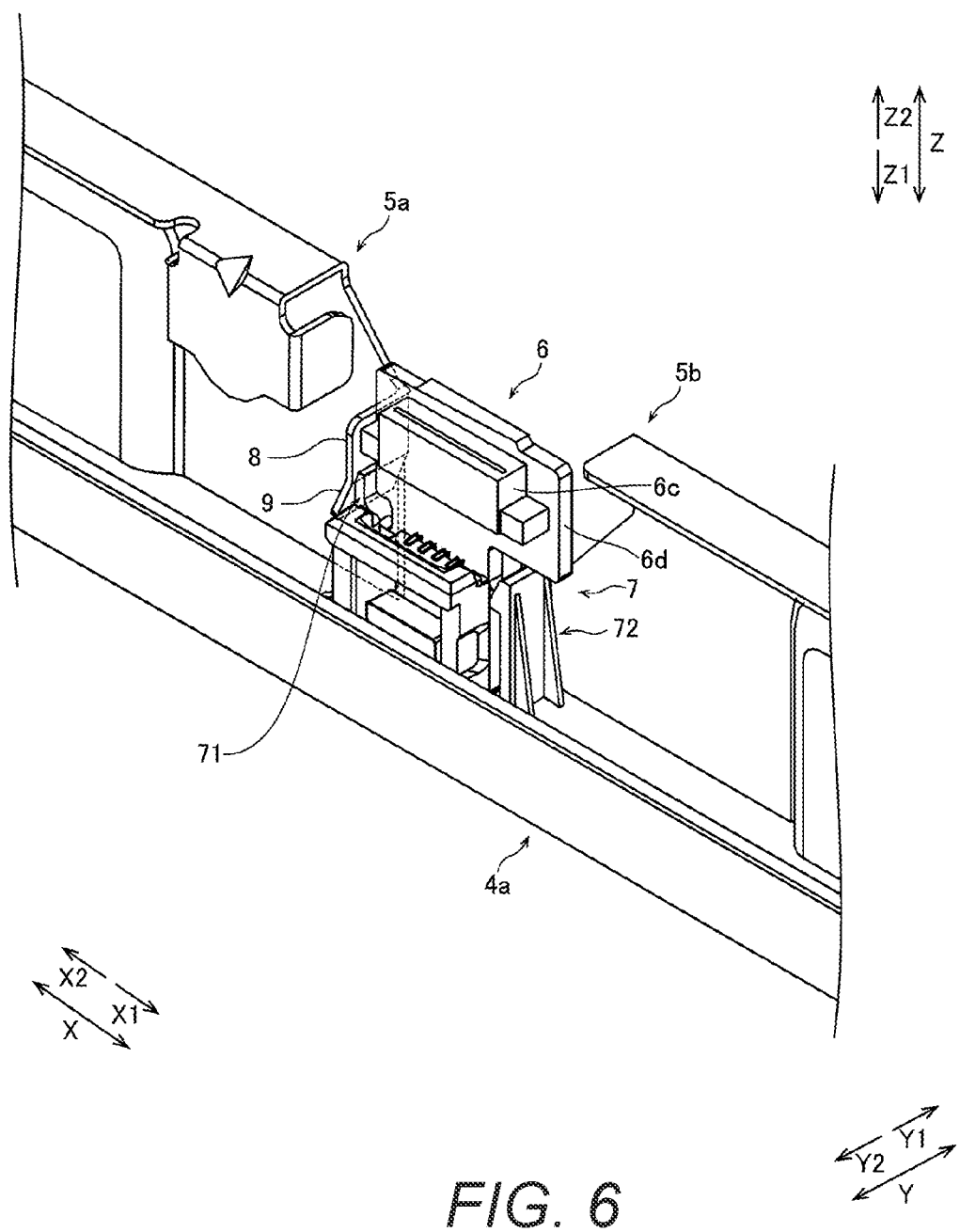
FIG. 6 is a perspective view of a state in which the front housing has been attached to the heat dissipating unit according to the first embodiment.

Here, as shown in FIGS. 5 to 7, the television device 100 of the first embodiment is provided with a movement restricting section 8 that is arranged relative to the movable hook 71 to restrict the movement of the movable hook 71. In the first embodiment, the movement restricting section 8 is provided integrally to the radiation plate 5a. More specifically, the movement restricting section 8 is formed integrally with the radiation plate 5a by bending a part of the metal radiation plate 5a. The movement restricting section 8 is provided at an end portion of the radiation plate 5a in the direction (the X direction) substantially parallel to the lengthwise direction of the display panel 3. The movement restricting section 8 is formed in a flat shape.

The movement restricting section 8 is configured to restrict the movement of the distal end portion of the movable hook 71. The movement restricting section 8 is provided so as to be opposite the distal end portion of the movable hook 71 in the direction in which the movable hook 71 opens (the X2 direction). Also, the movement restricting section 8 is configured such that when the distal end portion of the movable hook 71 moves in the opening direction, the movement restricting section 8 comes into contact with the distal end portion of the movable hook 71 and restricts the movement of the movable hook 71.

Also, in the first embodiment, the movement restricting section 8 and the movable hook 71 are arranged relative to each other with a gap S1 therebetween. The size of the gap S1 is less than the amount of engagement between the engaging portion 6f of the electronic unit 6 and the engaging portion 71a of the movable hook 71. In particular, the size of the gap S1 is smaller than an amount of deflection by which the movable hook 71 is deflected while the electronic unit 6 is being attached to the movable hook 71 (i.e., the amount of deflection is larger than the size of the gap S1). Consequently, even if the movable hook 71 moves in the opening direction (the X2 direction) by the gap S1, the engaging portion 6f of the electronic unit 6 will not disengage from the engaging portion 71a of the movable hook 71.

Also, in the first embodiment, the movement restricting section 8 is provided with a guide section 9 (guide) that guides or leads the electronic unit 6 that has been attached to the front cabinet 4a while the front cabinet 4a to which the electronic unit 6 has been attached is being attached to an attachment target (e.g., the radiation plates 5a and 5b and the rear frame 4b). The guide section 9 is provided integrally with the movement restricting section 8. More specifically, the guide section 9 is integrally formed with the radiation plate 5a together with the movement restricting section 8 by bending a part of the metal radiation plate 5a. The guide section 9 is formed in a flat shape. The guide section 9 is provided so as to be inclined with respect to the movement restricting section 8.

Also, the electronic unit 6 and the fixing section 7 are provided near the radiation plates 5a and 5b. More specifically, the electronic unit 6 and the fixing section 7 are provided between the radiation plates 5a and 5b in the direction (the X direction) substantially parallel to the lengthwise direction of the display panel 3.

Assembly of Television Device

Next, the method for assembling the television device 100 according to the first embodiment will be described with reference to FIGS. 3 to 7.

As shown in FIGS. 3 and 4, first, a step of attaching the electronic unit 6 to the front cabinet 4a is performed. This step includes a step of fixing the electronic unit 6 to the movable hook 71 and the fixed hook 72 of the fixing section 7 by moving the electronic unit 6 in the Z1 direction. This step includes a step of fixing the electronic unit 6 to the movable hook 71 and the fixed hook 72 of the fixing section 7 while bending and deforming the movable hook 71 in the opening direction (the X2 direction).

Then, as shown in FIGS. 5 to 7, a step of attaching the front cabinet 4a to which the electronic unit 6 has been attached to the radiation plates 5a and 5b is performed. More specifically, a step of attaching the front cabinet 4a to which the electronic unit 6 has been attached to the rear frame 4b via the radiation plates 5a and 5b is performed. The rear frame 4b is in a state in which the optical member 2, the display panel 3, the radiation plates 5a and 5b, and the like have been attached to the rear frame 4b. In FIGS. 5 to 7, for the sake of convenience, the illustrations of the optical member 2, the display panel 3, and the rear frame 4b are omitted.

Also, this step includes a step of attaching the front cabinet 4a to which the electronic unit 6 has been attached to the radiation plates 5a and 5b by moving the front cabinet 4a in the Z2 direction. This step includes a step of attaching the electronic unit 6 that has been attached to the front cabinet 4a to the radiation plates 5a and 5b while guiding the electronic unit 6 with the guide section 9. This step includes a step of guiding the electronic unit 6 that has been attached to the front cabinet 4a to a specific position between the radiation plates 5a and 5b with the guide section 9. Also, this step includes a step of using the guide section 9 to guide the electronic unit 6 that has been attached to the front cabinet 4a so that the movable hook 71 is disposed opposite the movement restricting section 8 that is provided to the radiation plate 5a. Consequently, in a state in which the front cabinet 4a is attached to the radiation plates 5a and 5b, the movement restricting section 8 can restrict the movement of the movable hook 71 in the opening direction (the X2 direction).

After this, a step of attaching a circuit board or the like to the back surface of the rear frame 4b, a step of attaching the rear cover 4c to the back surface of the rear frame 4b to which the circuit board or the like has been attached, and the like are performed. This completes the assembly of the television device 100.

Effect of First Embodiment

The following effect can be obtained with the first embodiment.

In the first embodiment, as described above, the movement restricting section 8 is provided to restrict the movement of the movable hook 71 that fixes the electronic unit 6 to the front cabinet 4a. Consequently, if an impact is applied from the outside, the movement of the movable hook 71 can be restricted by the movement restricting section 8. As a result, the movable hook 71 is less likely to open (move) enough for the electronic unit 6 to fall off. This makes it less likely that the electronic unit 6 will fall off the movable hook 71 due to the opening of the movable hook 71 when an impact is applied from the outside.

Also, in the first embodiment, as described above, the gap S1 is provided between the movement restricting section 8 and the movable hook 71. Consequently, after the assembly of the television device 100 is completed, the movement restricting section 8 restricts the movement of the movable hook 71 while the movement restricting section 8 and the movable hook 71 are less likely to interfere with each other during the assembling the television device 100. As a result, the television device 100 can be easily assembled.

Also, in the first embodiment, as described above, the television device 100 comprises the guide section 9 that is integrally provided to the movement restricting section 8 and that guides the electronic unit 6 that has been attached to the front cabinet 4a when the front cabinet 4a to which the electronic unit 6 has been attached is being attached to the attachment target. Consequently, the guide section 9 allows the electronic unit 6 to be easily disposed in a certain position. Also, since the guide section 9 is provided integrally with the movement restricting section 8, the structure is less likely to be complicated even though the guide section 9 is provided.

Also, in the first embodiment, as described above, the fixing section 7 includes the movable hook 71 and the fixed hook 72. Consequently, the electronic unit 6 can be fixed by using the fixed hook 72 which, unlike the movable hook 71, does not open. As a result, the electronic unit 6 can be fixed more securely.

Also, in the first embodiment, as described above, the television device 100 comprises the display panel 3, and the radiation plate 5a that is provided so as to extend in the direction substantially parallel to the lengthwise direction of the display panel 3 and that dissipates heat from the display panel 3. Also, the movement restricting section 8 is provided integrally with the radiation plate 5a. Consequently, the movement restricting section 8 can be provided by using the existing radiation plate 5a. As a result, the number of parts can be kept smaller than when the movement restricting section 8 is provided separately and individually.

Also, in the first embodiment, as described above, the radiation plate 5a is made of metal. Also, the movement restricting section 8 is formed integrally with the radiation plate 5a by bending a part of the metal radiation plate 5a. This allows the movement restricting section 8 to be easily formed simply by bending a part of the metal radiation plate 5a.

Also, in the first embodiment, as described above, the movement restricting section 8 is provided at the end portion of the radiation plate 5a in the direction substantially parallel to the lengthwise direction of the display panel 3. Consequently, the movement restricting section 8 can be provided more easily than when the movement restricting section 8 is provided somewhere other than at the end portion of the radiation plate 5a, such as in the central portion.

Also, in the first embodiment, as described above, the electronic unit 6 is a sensor unit for remote control operation. Consequently, it is less likely that the electronic unit 6 serving as a sensor unit for remote control operation will fall off the movable hook 71 due to the opening of the movable hook 71.

Second Embodiment

Figure 8:
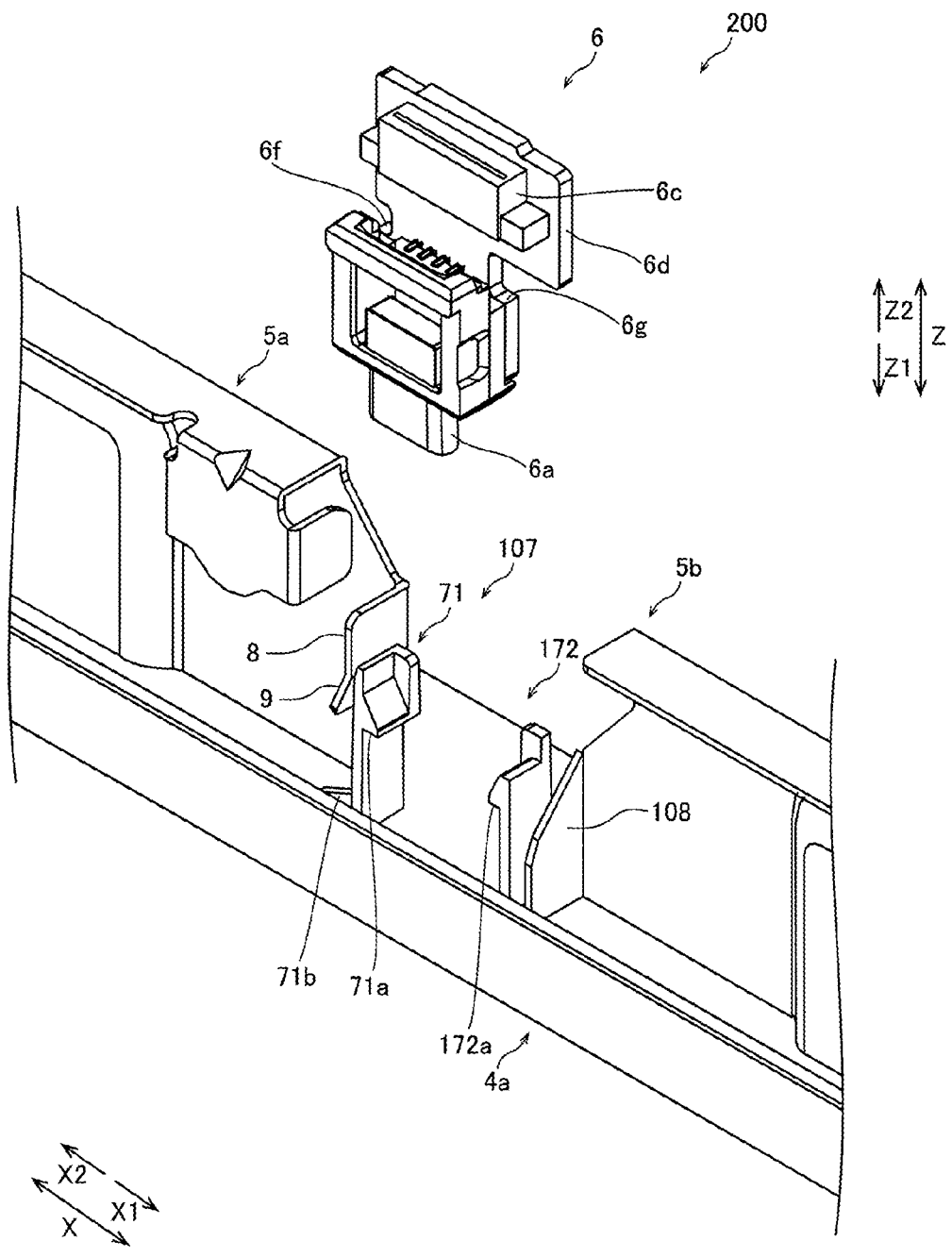
FIG. 8 is a perspective view of a fixing section and a movement restricting section of a television device according to a second embodiment.
Figure 9:
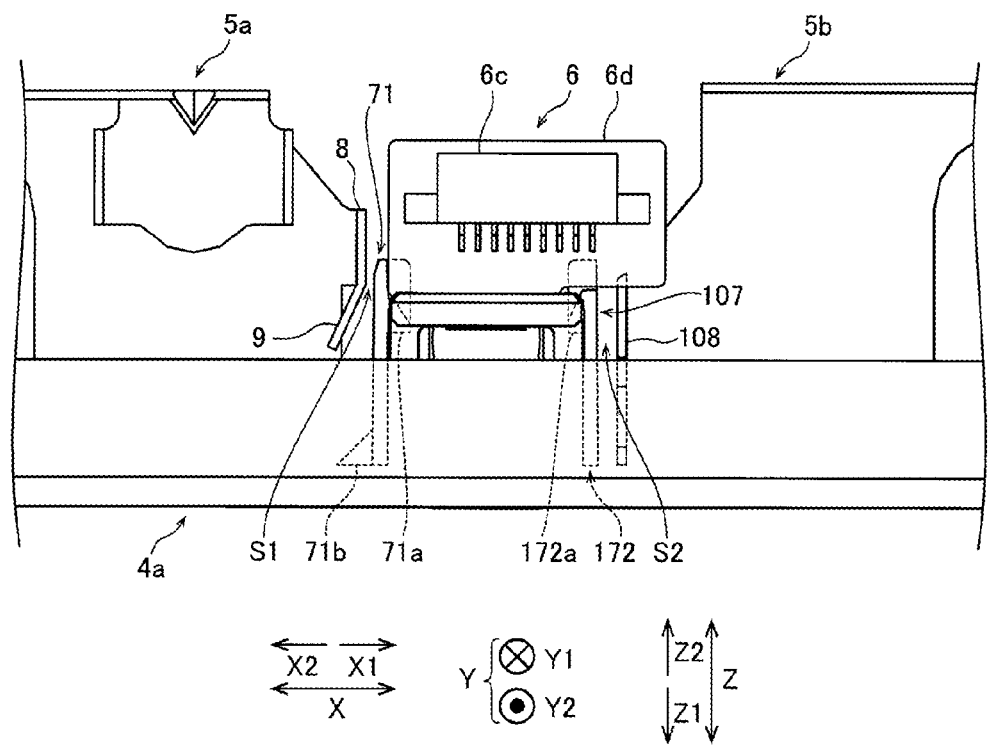
FIG. 9 is a side view of the fixing section and the movement restricting section of the television device according to the second embodiment.

Referring now to FIGS. 8 and 9, a television device 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In the second embodiment, unlike the first embodiment in which the fixing section includes the movable hook and the fixed hook, an example will be given in which a fixing section includes two movable hooks.

As shown in FIGS. 8 and 9, the television device 200 according to the second embodiment comprises a fixing section 107 instead of the fixing section 7 of the first embodiment. The fixing section 107 includes a movable hook 172 (e.g., a second hook) instead of the fixed hook 72 of the first embodiment. That is, the fixing section 107 includes the movable hook 71 of the first embodiment, as well as the movable hook 172. In the illustrated embodiment, the movable hook 172 is more flexible than the fixed hook 72 of the first embodiment, and is as flexible as the movable hook 71. However, the movable hook 172 can be more flexible than the movable hook 71 or less flexible than the movable hook 71, as long as the movable hook 71 and the movable hook 172 are both flexible. The television device 200 is an example of the "electronic device" and the "display device" of the present disclosure. Also, the movable hook 71 and the movable hook 172 are examples of the "first hook" and the "second hook" of the present disclosure, respectively. FIG. 8 shows a state in which the electronic unit 6 has been removed to make the drawing easier to understand.

The movable hook 172 has an engaging portion or prong 172a that engages with the engaging portion 6g of the electronic unit 6. In particular, the engaging portion 172a is disposed at a distal end portion of the movable hook 172. The movable hook 172 is configured to be able to open and close. More specifically, the movable hook 172 is a flexible member, and is movable in the direction (the X direction) substantially parallel to the lengthwise direction of the display panel 3 by bending and deforming. In particular, the movable hook 172 can be deflected by deflecting its distal end portion along the X direction with respect to its base portion, as the origin or fulcrum point. In the illustrated embodiment, the movable hook 172 does not have a rib. However, the movable hook 172 can be formed identical or mirror symmetric to the movable hook 71. In this case, the movable hook 172 can have a pair of ribs at the base portion of the movable hook 172. The ribs can add support to the movable hook 172 such that the movable hook 172 has enough rigidity to hold the electronic unit 6 that has been attached to the movable hook 172 while having enough flexibility to deflect while the electronic unit 6 is being attached to the movable hook 172.

The electronic unit 6 is configured to be fixed to the movable hook 71 and the movable hook 172 by being moved in the Z1 direction (the attachment direction) so as not to come off in the opposite direction (the Z2 direction) from the attachment direction. Thus, in the illustrated embodiment, the movable hook 71 and the movable hook 172 are configured to be deflected in different directions (i.e., the X2 direction and the X1 direction) from each other while the electronic unit 6 is being attached to the movable hook 71 and the movable hook 172.

Also, in the second embodiment, the television device 200 comprises a movement restricting section 108 (e.g., an additional movement restricting section) arranged relative to the movable hook 172 to restrict the movement of the movable hook 172, in addition to the movement restricting section 8 of the first embodiment. That is, in the second embodiment, the movement restricting sections 8 and 108 are individually provided to the movable hook 71 and the movable hook 172, respectively.

The movement restricting section 108 is integrally provided to the radiation plate 5b. More specifically, the movement restricting section 108 is formed integrally with the radiation plate 5b by bending a part of the metal radiation plate 5b. The movement restricting section 108 is provided at an end portion of the radiation plate 5b in the direction (the X direction) substantially parallel to the lengthwise direction of the display panel 3. The movement restricting section 108 is formed in a flat shape. The radiation plate 5b is an example of the "heat dissipating unit" of the present disclosure.

The movement restricting section 108 is provided so as to be opposite the movable hook 172 in the direction (the X1 direction) in which the movable hook 172 opens. Also, the movement restricting section 108 is configured such that when the movable hook 172 moves in the opening direction, the movement restricting section 108 comes into contact with the movable hook 172 to restrict the movement of the movable hook 172.

Also, in the second embodiment, the movement restricting section 108 and the movable hook 172 are arranged relative to each other with a gap S2 therebetween. The size of the gap S2 is less than the amount of engagement between the engaging portion 6g of the electronic unit 6 and the engaging portion 172a of the movable hook 172. In particular, the size of the gap S2 is smaller than an amount of deflection by which the movable hook 172 is deflected while the electronic unit 6 is being attached to the movable hook 172 (i.e., the amount of deflection is larger than the size of the gap S2). Consequently, even if the movable hook 172 moves in the opening direction (the X1 direction) by the gap S2, the engaging portion 6g of the electronic unit 6 will not be disengaged from the engaging portion 172a of the movable hook 172.

The rest of the configuration of the second embodiment is the same as in the first embodiment.

Effect of Second Embodiment

The following effect can be obtained in the second embodiment.

In the second embodiment, as described above, the fixing section 107 includes the movable hook 71 and the movable hook 172. As a result, the electronic unit 6 can be attached to the front cabinet 4a while opening the two movable hooks, namely, the movable hook 71 and the movable hook 172. As a result, the electronic unit 6 can be easily attached to the front cabinet 4a.

Also, in the second embodiment, as described above, the movement restricting sections 8 and 108 are individually provided with respect to the movable hook 71 and the movable hook 172. Consequently, even though the fixing section 107 includes two movable hooks, namely, the movable hook 71 and the movable hook 172, the electronic unit 6 can be reliably prevented from falling off the movable hooks due to the opening of the movable hooks.

The other effects of the second embodiment are the same as those of the first embodiment.

Third Embodiment

Figure 10:
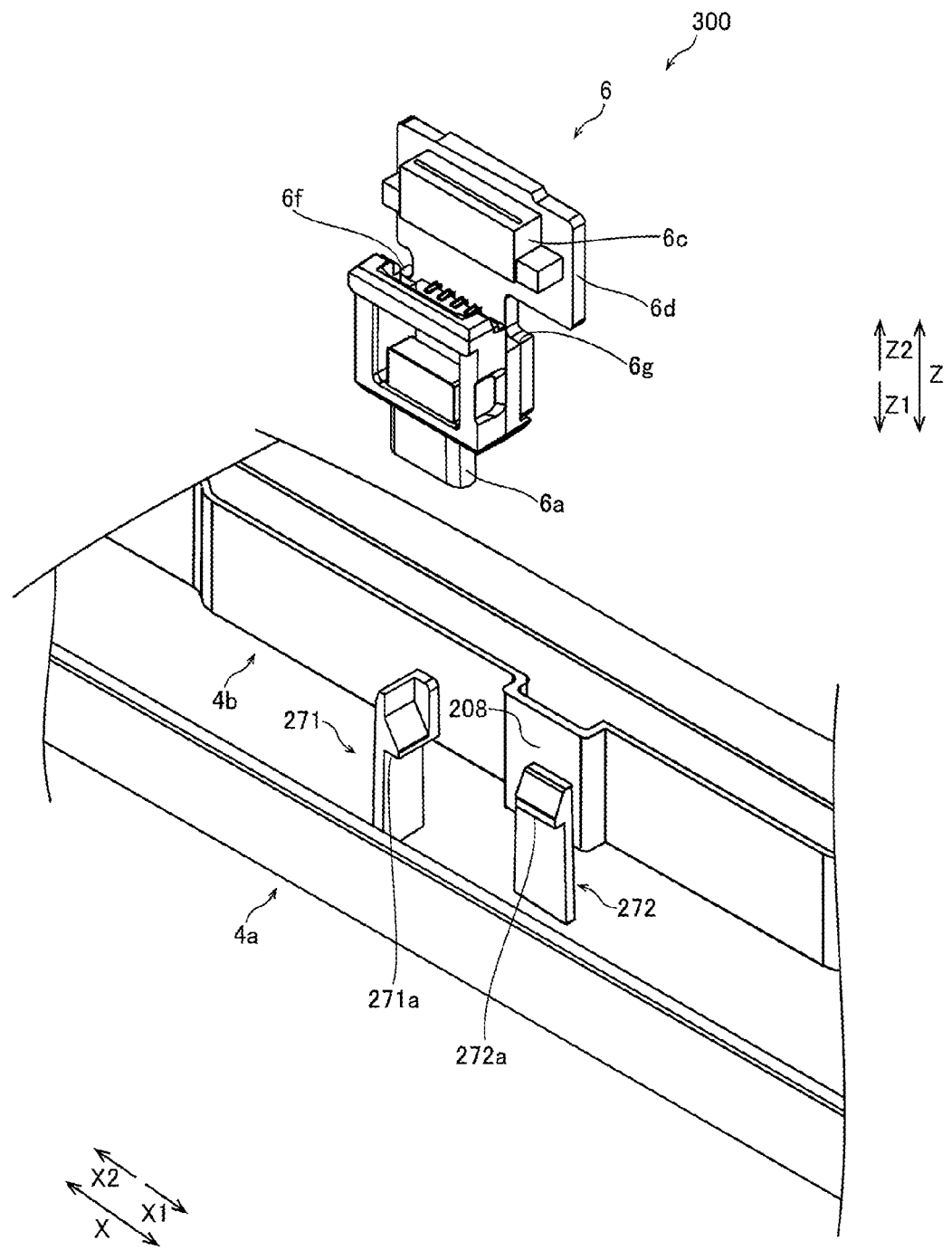
FIG. 10 is a perspective view of a fixing section and a movement restricting section of a television device according to a third embodiment.

Referring now to FIG. 10, a television device 300 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. In the third embodiment, unlike in the first and second embodiments, an example will be given in which a movement restricting section is provided to a rear frame.

As shown in FIG. 10, the television device 300 of the third embodiment comprises a fixing section 207 instead of the fixing section 7 of the first embodiment. The fixing section 207 includes a fixed hook 271 and a movable hook 272 instead of the movable hook 71 and the fixed hook 72 of the first embodiment. The television device 300 is an example of the "electronic device" and "display device" of the present disclosure. Also, FIG. 10 shows a state in which the electronic unit 6 has been removed to make the drawing easier to understand. Also, in FIG. 10, the illustrations of the radiation plates 5a and 5b are omitted.

The fixed hook 271 has an engaging portion or prong 271a that engages with the engaging portion 6f of the electronic unit 6. In particular, the engaging portion 271a is disposed at a distal end portion of the fixed hook 271. Also, the fixed hook 271 does not open and close. More specifically, the fixed hook 271 is a relatively rigid member. The fixed hook 271 is immovable in the direction (the X direction) substantially parallel to the lengthwise direction of the display panel 3, and does not bend and deform. The fixed hook 271 can also be formed identical or mirror symmetric to the fixed hook 72, for example, except for an arrangement relative to the electronic unit 6.

The movable hook 272 has an engaging portion or prong 272a that engages with the engaging portion 6g of the electronic unit 6. In particular, the engaging portion 272a is disposed at a distal end portion of the movable hook 272. Also, the movable hook 272 is configured to be able to open and close. More specifically, the movable hook 272 is a flexible member and is movable in a direction (the Y direction) substantially parallel to the short side direction of the display panel 3 by bending and deforming. In particular, the movable hook 272 can be deflected by deflecting its distal end portion along the Y direction with respect to its base portion, as the origin or fulcrum point. The movable hook 272 can also be formed identical or mirror symmetric to the movable hook 71, for example, except for an arrangement relative to the electronic unit 6.

The electronic unit 6 is configured to be fixed to the fixed hook 271 and the movable hook 272 by being moved in the Z1 direction (attachment direction) so as not to come off in the opposite direction (the Z2 direction) from the attachment direction.

Also, in the third embodiment, the television device 300 comprises a movement restricting section 208 instead of the movement restricting section 8 of the first embodiment. The movement restricting section 208 is integrally provided to the rear frame 4b. More specifically, the movement restricting section 208 is formed integrally with the rear frame 4b by drawing a part of the metal rear frame 4b. The movement restricting section 208 is provided at an end portion of the rear frame 4b in the direction (the Y direction) substantially parallel to the short side direction of the display panel 3. The movement restricting section 208 is formed in a flat shape.

The movement restricting section 208 is configured to restrict the movement of the movable hook 272. The movement restricting section 208 is provided so as to be opposite the movable hook 272 in the direction (the Y1 direction) in which the movable hook 272 opens. Also, the movement restricting section 208 is configured to restrict the movement of the movable hook 272 by coming into contact with the movable hook 272 when the movable hook 272 moves in the opening direction.

The rest of the configuration of the third embodiment is the same as in the first embodiment. On the other hand, in the illustrated embodiment, the fixed hook 271 can be formed as a movable hook. In this case, this movable hook and the movable hook 272 are configured to be deflected in different directions (i.e., the X2 direction and the Y1 direction) from each other while the electronic unit 6 is being attached to this movable hook and the movable hook 272.

Effect of Third Embodiment

The following effect can be obtained in the third embodiment.

In the third embodiment, as described above, the movement restricting section 208 is integrally provided to the rear frame 4b. Consequently, the movement restricting section 208 can be provided by using the existing rear frame 4b. As a result, the number of parts can be kept smaller than when the movement restricting section 208 is provided separately and individually.

Other effects of the third embodiment are the same as those of the first embodiment.

MODIFICATION EXAMPLES

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to third embodiments described above, an example is given in which the present invention is applied to a television device, but the present invention is not limited to this. For example, the present invention may be applied to a display device other than a television device. For instance, the present invention may be applied to any typical display device, such as a display device for a PC (personal computer). Also, the present invention may be applied, for example, to an electronic device other than a television device. For instance, the present invention may be applied to typical electronic devices such as Blu-ray disc recorders and printers.

Also, in the first to third embodiments described above, an example is given in which the electronic unit is attached to the front cabinet (front housing), but the present invention is not limited to this. In the present invention, the electronic unit may be attached to a housing other than the front housing, such as the rear housing or an intermediate housing.

Also, in the first to third embodiments described above, an example is given in which the electronic unit is a sensor unit for remote control operation, but the present invention is not limited to this. In the present invention, the electronic unit may be a sensor unit in applications other than remote control operation. Also, the electronic unit does not have to be a sensor unit.

Also, in the first to third embodiments, an example is given in which the movement restricting section is integrally provided to the radiation plate (heat dissipating unit) or the rear frame, but the present invention is not limited to this. In the present invention, the movement restricting section may be provided separately from the heat dissipating unit or the rear frame, and may be attached to the heat dissipating unit or the rear frame. Also, the movement restricting section may be provided to a member other than the heat dissipating unit or the rear frame. In this case, the movement restricting section can be provided by using a member in the vicinity of the movable hook.

Also, in the first to third embodiments, an example is given in which the movement restricting section is provided to a metal member (the radiation plate (heat dissipating unit) or the rear frame), but the present invention is not limited to this. In the present invention, the movement restricting section may be provided to a resin member.

Also, in the first to third embodiments, an example is given in which the fixing section included two hooks (two hooks including the fixed hook and the movable hook, or two movable hooks), but the present invention is not limited to this. In the present invention, the fixing section may include three or more hooks, so long as at least one movable hook is included. Also, the fixing section may include only one movable hook.

Also, in the first and second embodiments, an example is given in which a gap is provided between the movement restricting section and the movable hook, but the present invention is not limited to this. In the present invention, a gap need not be provided between the movement restricting section and the movable hook.

Also, in the first and second embodiments, an example is given in which the guide section is integrally provided to the movement restricting section, but the present invention is not limited to this. In the present invention, a guide section need not be provided.

(1) In view of the state of the known technology and in accordance with a first aspect of the present invention, an electronic device comprises a housing, an electronic unit attached to the housing, a fixing section provided to the housing and including a first hook that holds the electronic unit relative to the housing, and a movement restricting section arranged relative to the first hook to restrict movement of the first hook.

With the electronic device according to the first aspect of the present invention, as described above, the movement restricting section is provided for restricting the movement of the first hook that holds the electronic unit relative to the housing. Consequently, when an impact is applied from the outside, the movement of the first hook can be restricted by the movement restricting section. As a result, the first hook will be less likely to open (move) far enough for the electronic unit to fall off. Therefore, when an impact is applied from the outside, it is less likely that the electronic unit will fall off the first hook due to the opening of the first hook.

(2) In accordance with a preferred embodiment according to the electronic device mentioned above, the first hook is arranged relative to the movement restricting section with a gap therebetween. With this configuration, after the assembly of the electronic device is completed, the movement of the first hook is restricted by the movement restricting section, and during assembly of the electronic device, the movement restricting section and the first hook can be prevented from interfering with each other. As a result, the electronic device can be assembled more easily.

(3) In accordance with a preferred embodiment according to any one of the electronic devices mentioned above, the first hook is configured to be deflected by an amount of deflection while the electronic unit is being attached to the first hook, the amount of deflection being larger than a size of the gap.

(4) In accordance with a preferred embodiment according to any one of the electronic devices mentioned above, the electronic device further comprises a guide section integrally provided to the movement restricting section and guiding the electronic unit while the housing to which the electronic unit has been attached is being attached to an attachment target. With this configuration, the guide section allows the electronic unit to be easily disposed in a certain position. Also, since the guide section is integrally provided to the movement restricting section, the structure is less likely to become complicated even when the guide section is provided.

(5) In accordance with a preferred embodiment according to any one of the electronic devices mentioned above, the fixing section further includes a second hook that holds the electronic unit relative to the housing.

(6) In accordance with a preferred embodiment according to any one of the electronic devices mentioned above, the first hook is more flexible than the second hook. With this configuration, the electronic unit can be fixed using the second hook, as a fixed hook that is not likely to open than the first hook, as a movable hook, for example. As a result, the electronic unit can be fixed more securely.

(7) In accordance with a preferred embodiment according to any one of the electronic devices mentioned above, the first hook has a greater amount of deflection than that of the second hook while the electronic unit is being attached to the first hook and the second hook.

(8) In accordance with a preferred embodiment according to any one of the electronic devices mentioned above, the first hook and the second hook are both flexible. With this configuration, the electronic unit can be attached to the housing while using the first hook and the second hook, as two movable hooks, namely, a first movable hook and a second movable hook, that can be opened, for example. As a result, the electronic unit can be easily attached to the housing.

(9) In accordance with a preferred embodiment according to any one of the electronic devices mentioned above, the electronic device further comprises an additional movement restricting section arranged relative to the second hook to restrict movement of the second hook. Thus, the movement restricting section and the additional movement restricting section are individually provided relative to the first hook and the second hook, respectively. With this configuration, even when the fixing section includes the first hook and the second hook, as two movable hooks, namely, the first movable hook and the second movable hook, the electronic unit can be effectively prevented from falling off the two movable hooks due to the opening of the two movable hooks.

(10) In accordance with a preferred embodiment according to any one of the electronic devices mentioned above, the electronic device further comprises a display panel and a heat dissipating unit extending in a direction substantially parallel to a lengthwise direction of the display panel, and configured to dissipate heat from the display panel, the movement restricting section being provided integrally with the heat dissipating unit. With this configuration, the movement restricting section can be provided by utilizing an existing heat dissipating unit. As a result, the number of parts can be kept smaller than when the movement restricting section is provided separately and individually.

(11) In accordance with a preferred embodiment according to any one of the electronic devices mentioned above, the heat dissipating unit is made of metal, and the movement restricting section is formed integrally with the heat dissipating unit by bending a part of the heat dissipating unit. With this configuration, the movement restricting section can be easily formed simply by bending a part of the metal heat dissipating unit.

(12) In accordance with a preferred embodiment according to any one of the electronic devices mentioned above, the movement restricting section is provided at an end portion of the heat dissipating unit in the direction substantially parallel to the lengthwise direction of the display panel. With this configuration, the movement restricting section can be provided more easily than when the movement restricting section is provided somewhere other than at the end portion of the heat dissipating unit, such as in the central portion.

(13) In accordance with a preferred embodiment according to any one of the electronic devices mentioned above, the electronic device further comprises a display panel and a rear frame provided on a back side with respect to the display panel, the movement restricting section being integrally provided to the rear frame. With this configuration, the movement restricting section can be provided by using an existing rear frame. As a result, the number of parts can be kept smaller than when the movement restricting section is provided separately and individually.

(14) In accordance with a preferred embodiment according to any one of the electronic devices mentioned above, the electronic unit is a sensor unit for remote control operation. With this configuration, the electronic unit serving as a sensor unit for remote control operation will be less likely to fall off the first hook due to the opening of the first hook when an impact is applied from the outside.

(15) In view of the state of the known technology and in accordance with a second aspect of the present invention, a display device comprises a display panel, a heat dissipating unit configured to dissipate heat from the display panel, and any one of the electronic devices mentioned above. The housing including a front housing provided on a front side with respect to the display panel, and the movement restricting section being integrally provided to the heat dissipating unit or the rear frame. Furthermore, the electronic unit can be attached to the front housing, the fixing section can be provided to the front housing and the first hook can hold the electronic unit relative to the front housing, for example.

With the display device according to the second aspect of the present invention, as described above, the movement restricting section is provided for restricting the movement of the first hook. This makes it less likely that the electronic unit will fall off the first hook due to the opening of the first hook when an impact is applied from the outside, just as with the electronic device according to the first aspect. Also, the movement restricting section is integrally provided to the heat dissipating unit or the rear frame. Consequently, the movement restricting section can be provided by utilizing an existing heat dissipating unit or rear frame. As a result, the number of parts can be kept smaller than when the movement restricting section is provided separately and individually.

(16) In accordance with a preferred embodiment according to any one of the electronic devices mentioned above, the first hook has a prong that is engaged with the electronic device.

(17) In accordance with a preferred embodiment according to any one of the electronic devices mentioned above, the first hook and the second hook each has a prong that is engaged with the electronic device.

(18) In accordance with a preferred embodiment according to any one of the electronic devices mentioned above, the first hook has a rib that supports the first hook, and the second hook has a rib that supports the second hook.

(19) In accordance with a preferred embodiment according to any one of the electronic devices mentioned above, the rib of the first hook is shorter than the rib of the second hook.

(20) In accordance with a preferred embodiment according to any one of the electronic devices mentioned above, the first hook and the second hook are configured to be deflected in different directions from each other while the electronic unit is being attached to the first hook and the second hook.

The present invention, as described above, can provide an electronic device and a display device with which it is less likely that an electronic unit will fall off a hook due to the opening of the hook when an impact is applied from the outside.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a television device in an upright position. Accordingly, these directional terms, as utilized to describe the television device should be interpreted relative to a television device in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electronic device comprising:
a housing;
an electronic unit attached to a front cabinet of the housing;
a fixing section provided to the housing and including a first hook that holds the electronic unit relative to the housing;
a movement restricting section arranged relative to the first hook to restrict movement of the first hook;
a display panel; and
a heat dissipating unit extending in a direction substantially parallel to a lengthwise direction of the display panel and the front cabinet, and configured to dissipate heat from the display panel,
the movement restricting section being provided integrally with the heat dissipating unit,
the heat dissipating unit being made of metal, and
the movement restricting section being formed integrally with the heat dissipating unit by bending a part of the heat dissipating unit.

2. The electronic device according to claim 1, wherein the first hook is arranged relative to the movement restricting section with a gap therebetween.

3. The electronic device according to claim 2, wherein the first hook is configured to be deflected by an amount of deflection while the electronic unit is being attached to the first hook, the amount of deflection being larger than a size of the gap.

4. The electronic device according to claim 1, further comprising:
a guide section integrally provided to the movement restricting section and guiding the electronic unit while the housing to which the electronic unit has been attached is being attached to an attachment target.

5. The electronic device according to claim 1, wherein the fixing section further includes a second hook that holds the electronic unit relative to the housing.

6. The electronic device according to claim 5, wherein the first hook is more flexible than the second hook.

7. The electronic device according to claim 5, wherein the first hook has a greater amount of deflection than that of the second hook while the electronic unit is being attached to the first hook and the second hook.

8. The electronic device according to claim 5, wherein the first hook and the second hook are both flexible.

9. The electronic device according to claim 8, further comprising
an additional movement restricting section arranged relative to the second hook to restrict movement of the second hook.

10. The electronic device according to claim 1, wherein the movement restricting section is provided at an end portion of the heat dissipating unit in the direction substantially parallel to the lengthwise direction of the display panel.

11. The electronic device according to claim 1, further comprising:
a rear frame provided on a back side with respect to the display panel.

12. The electronic device according to claim 1, wherein the electronic unit is a sensor unit for remote control operation.

13. A display device comprising:
the electronic device according to claim 1,
the housing including the front cabinet provided on a front side with respect to the display panel, and a rear frame provided on a back side with respect to the display panel.

14. The electronic device according to claim 1, wherein the first hook has a prong that is engaged with the electronic device.

15. The electronic device according to claim 5, wherein the first hook and the second hook each has a prong that is engaged with the electronic device.

16. The electronic device according to claim 5, wherein the first hook has a rib that supports the first hook, and the second hook has a rib that supports the second hook.

17. The electronic device according to claim 16, wherein the rib of the first hook is shorter than the rib of the second hook.

18. The electronic device according to claim 5, wherein the first hook and the second hook are configured to be deflected in different directions from each other while the electronic unit is being attached to the first hook and the second hook.

* * * * *